Patented Dec. 12, 1933

1,939,192

UNITED STATES PATENT OFFICE 1,939,192

PROCESS OF CONDENSING AROMATIC AMINES WITH BUTYRALDEHYDE AND PRODUCTS OBTAINED THEREBY

Ira Williams, Lakewood, Ohio, assignor, by mesne assignments, to E. I. du Pont de Nemours & Company, Wilmington, Del., a corporation of Delaware No Drawing. Application May 22, 1928
Serial No. 279,851

35 Claims. (Cl. 260—130)

n-Butyraldehyde is capable of reacting with aromatic amines in various proportions and under various conditions. In each instance a product is obtained having properties which differentiate it clearly from the products obtained under other conditions. It is well known that commercial n-butyraldehyde often contains traces of butyric acid. When such a product is mixed in molecular proportions with an amine a reaction occurs with separation of water, and the resulting product has some accelerating properties in the vulcanization of rubber. If a perfectly neutral butyraldehyde is added to, for instance, aniline, under conditions where acid is excluded, a crystalline compound is obtained which represents probably a di-molecular simple condensation product as evidenced by molecular weight determination and elementary analysis. This product has, however, no accelerating properties whatsoever; nor does it retard, when contained in vulcanized rubber, the slow deterioration of such vulcanizates.

I have now found that by condensing equi-molecular amounts of n-butyraldehyde with aromatic amines in the presence of certain amounts of a weak organic acid, an entirely different reaction occurs. The products obtained are powerful stabilizers, or retarders of the deterioration of rubber and, in certain instances, they also have the property of accelerating the vulcanization of rubber.

My novel process comprises the use of weak organic acids, amongst which may be mentioned the aliphatic carboxylic acids having two or more carbon atoms in the molecule, such as acetic, propionic, butyric acids, etc. in the reaction between equi-molecular or equivalent amounts of n-butyraldehyde and an aromatic primary amine. In condensing the aldehyde with aromatic diamines, etc., I can use 1 equivalent of aldehyde for each amino group or condense only 1 of the amino groups in the molecule with the aldehyde.

The acid is used in concentrated form, in which case the reaction is practically instantaneous; the water separating out does not seem to influence the reaction. The weak acids which I prefer to use are those which have a dissociation constant $k$ as determined at room temperature in aqueous solution, less than about $2 \times 10^{-5}$. It is noted, in this connection, that the dissociation constant for acetic acid is given in the literature as $1.8 \times 10^{-5}$; similarly, that for propionic acid is $1.45 \times 10^{-5}$, and for butyric acid $1.75 \times 10^{-5}$.

The strength of the acid used in this condensation reaction is of prime importance for producing condensates valuable in the vulcanization of rubber. Stronger acids than those specified above will, when used in concentrated form, influence the reaction in an undesirable direction, the resulting condensates having neither accelerating nor any marked antioxidant properties.

The amount of acid used is also an important factor in determining the properties of the condensates.

From practically zero with condensation products made in the absence of acid the accelerating antioxidant properties increase with increasing amounts of acid used until about 1/30 mol. of acid is used, when both properties are near their maximum. Increasing the amount of acid further will decrease the accelerating properties, whereas the antioxidant properties remain about the same. It is in this manner possible to obtain various combinations of accelerating and antioxidant properties, which makes my process and the products obtained thereby, particularly useful in the rubber industry. I am able to produce from the same raw materials, by similar processes and in the same equipment accelerators adaptable to the various vulcanization conditions encountered in this art.

The acid concentrations below about 1/50 mol. do not produce any material which has sufficient accelerating and antioxidant properties which would make them of any practical value in the rubber industry, and I do not consider such a condensation carried out in the presence of lower acid concentrations than about 1/50 mol. nor the products obtained thereby, as coming within the scope of my invention. The concentration of 1/50 mol. butyric acid in butyraldehyde corresponds to about 2.4%. Commercial butyraldehyde is available in a high grade of purity and does not contain on the average more than ½ of 1% butyric acid, and, as a matter of fact, none of the numerous samples of technical and commercial butyraldehyde ever tested by me contained more than about 1% of acid expressed as butyric acid. Direct condensation of such aldehyde with an aromatic amine will not produce my novel combined accelerator-antioxidants.

In its broadest form, my novel process comprises mixing equivalent amounts of n-butyraldehyde and an aromatic amine in the presence of at least 1/50 molecular equivalent of a weak organic acid. The acid is preferably added to either or both of the other components before mixing.

The reaction is exothermic and is best performed by adding the aldehyde slowly to the amine containing the desired amount of acid. The aldehyde reacts instantaneously, as is evidenced by the fact that practically water only distills off during the addition of the aldehyde. Rate of addition is merely dependent on the cooling and refluxing capacity of the equipment used and is best adjusted to conditions whereby the reaction water distills. This can be allowed to escape or is returned by a reflux condenser. After all aldehyde has been added, the water is allowed to settle and is either drawn off or is distilled off, preferably in vacuum, together with most of the acid added originally. It is advisable, particularly when using high acid concentrations, to free the reaction product from this excess acid as it would otherwise impair the properties of the finished product.

The resulting products are usually yellow to brownish liquids at ordinary temperature. Those produced in the presence of relatively small amounts of a weak organic acid are powerful accelerators and excellent antioxidants. Those produced by the action of large amounts of acid have no unusual effect on the rate of vulcanization, but retain the antioxidant properties.

I am not aware of any chemical theory which could explain the difference in properties of the products obtained in the absence and in the presence of varying proportions and kinds of acids, and no attempt is made to account for this difference by chemical formulæ or chemical reactions other than those involving the influence upon the vulcanization of rubber.

The following examples will further illustrate my invention; the parts given are by weight.

1. For comparison purpose, I am giving in this example the preparation of a condensation product which has neither accelerating nor antioxidant, or anti-ageing properties.

This was made by mixing 1080 grams of neutral butyraldehyde with 1395 grams aniline (molecular ratio 1:1). Condensation took place readily and the water was distilled out up to 120° C. measured in the liquid.

The reaction mass set to a mass of crystals on cooling. Recrystallized from alcohol the product was obtained in the form of colorless needles melting at 92° C. Molecular weight determinations by the cryoscopic method indicate a molecular weight of 295 and an elementary analysis gave 80.7% C and 9.0% H, which figures are a close approximation of a dimolecular simple condensation product of butyraldehyde and aniline. This product does not accelerate the vulcanization, nor does it prevent the deterioration of vulcanizates made in its presence; indications are that it rather speeds up such deterioration.

The following examples describe in detail the preparation of various antioxidants made in accordance with my invention:

2. 1080 parts commercial butyraldehyde are slowly added to 1395 parts aniline, mixed with 32.4 parts glacial acetic acid, which is in the molecular ratio of 1:1:0.034. The temperature rises to 100° C. and water distills off; heat is then applied until all the water and most of the acid are driven off. The reaction product is a light amber colored, slightly viscous, liquid.

1% of this material added to a rubber mix containing 100 parts rubber, 3 sulfur, and 5 zinc oxide, increases the rate of vulcanization about four times over a blank.

Vulcanizates obtained from rubber mixes to which small amounts of this product have been added, with or without the presence of another accelerator, such as, for instance, a disubstituted guanidine, have at least three times the useful life of similar vulcanizates made without this particular butyraldehyde-aniline condensate.

3. 1395 parts aniline and 900 parts glacial acetic acid are mixed and then 1080 parts n-butyraldehyde slowly added (molecular ratio 1:1:1). Reaction takes place instantaneously and water distills off. When all the aldehyde is added, heat is applied until most of the water and acid are eliminated. Vacuum is then applied and at an inside temperature of 120° C. and under 60 m.m. mercury, practical dehydration and removal of the acid is obtained. The resulting product is at ordinary temperature a light yellow, slightly viscous, liquid. This product does not accelerate vulcanization of rubber. It has, however, a very beneficial influence upon the life of rubber goods made in its presence.

4. 450 parts glacial acetic acid are added to 1395 parts aniline and 1080 parts n-butyraldehyde are slowly introduced. This is a molecular ratio of ½:1:1. The aldehyde reacts practically instantaneously; the water formed and acid are distilled off, and a slightly yellow viscous liquid is obtained. This product has no accelerating properties, but is an excellent antioxidant or deterioration retarder.

5. 143 parts alpha-naphthylamine are dissolved in 60 parts glacial acetic acid and 72 parts butyraldehyde are run in slowly. This is in the molecular proportion of 1:1:1. The reaction is strongly exothermic and water distills off. Heat is applied after all of the aldehyde has been added, and the water and excess acetic acid are removed under vacuum. The resulting brownish liquid is an excellent antioxidant for rubber; it has, however, almost no accelerating properties.

6. 107 parts O-toluidine are dissolved in 120 parts glacial acetic acid and 72 parts butyraldehyde are slowly added. This is in the molecular proportion of 1 amine:2 acid:1 aldehyde. Water is split off and after completion of the reaction, heat is applied, and the water and acetic acid are distilled off under vacuum. The resulting yellowish, somewhat viscous, liquid has almost no accelerating properties, but is an excellent antioxidant for rubber.

Slight amounts of acid remaining in the final product do not seem to have any effect upon the properties of my novel condensates.

Instead of the acetic acid used in the above examples, I can use other weak organic acids. In using acids which are non-volatile under the conditions cited in the above examples, it is advisable to remove same, after condensation is finished, by a treatment with a neutralizing agent as, for instance, by washing the product with dilute caustic alkali.

I can also use a mixture of different aromatic primary amines; the reaction proceeds in a similar manner in the presence of specified amounts of the weak organic acid, and the resulting condensates have similar antioxidant properties. Similarly, mixtures of the specified weak organic acids will influence the condensation in the same manner.

The terms "condensing", "condensation reaction", "condensates", etc., as used herein, do not imply any particular chemical reaction or chemical structure of the resulting products, but indicate merely that a reaction with splitting off of water occurs.

The expression "antioxidants" is used in its commercial sense, and means a product which retards the ageing or deterioration of vulcanized rubber. As well known in this art, this deterioration is usually measured in the laboratory by the so-called Geer test, which involves the heating of samples of the vulcanizate for various periods of time at 70° C. and determination of the physical properties of said samples

I claim:

1. A n-butyraldehyde-aromatic primary amine condensate which has antioxidant properties for vulcanized rubber, and which is substantially identical with the reaction product obtained by reacting with equi-molecular amounts of n-butyraldehyde upon a primary aromatic amine in the presence of between about 1/30 and about 2 molecular amounts of a weak organic acid for each molecular amount of the aldehyde, and eliminating the excess acid and the water formed.

2. A n-butyraldehyde-aromatic primary amine condensate which has antioxidant properties for vulcanized rubber, and which is substantially identical with the reaction product obtained by reacting with equi-molecular amounts of n-butyraldehyde upon a primary aromatic monoamine in the presence of between about 1/30 and about 2 molecular amounts of a weak organic acid for each molecular amount of the aldehyde, said acid having a dissociation constant $k$ measured at room temperature and in aqueous solution less than about $2 \times 10^{-5}$, and eliminating the excess acid and the water formed.

3. A n-butyraldehyde-primary aromatic amine condensate which has antioxidant properties for vulcanized rubber, and which is substantially identical with the reaction product obtained by reacting with equi-molecular amounts of n-butyraldehyde upon a primary aromatic monoamine in the presence of from about 1/30 to about 2 molecular amounts of a volatile organic acid for each molecular amount of the aldehyde, said acid having a dissociation constant $k$ measured at room temperature and in aqueous solution less than about $2 \times 10^{-5}$, and eliminating the excess acid and the water formed.

4. A light yellow, slightly viscous liquid having antioxidant properties for vulcanized rubber, and which is substantially identical with the reaction product obtained by reacting equi-molecular amounts of n-butyraldehyde with aniline containing from about 1/30 to about 2 molecular amounts of acetic acid for each molecular amount of the aldehyde, and eliminating the excess acid and the water formed.

5. The process of condensing n-butyraldehyde with an aromatic primary amine, which comprises mixing equi-molecular amounts of said aldehyde and amine in the presence of between about 1/30 and about 2 of a weak organic acid moles for each molecular amount of the aldehyde.

6. The process of condensing n-butyraldehyde with an aromatic primary amine, which comprises mixing equi-molecular amounts of n-butyraldehyde and a primary aromatic monoamine in the presence of from about 1/30 to about 2 molecular amounts of an organic carboxylic acid for each molecular amount of the aldehyde, said acid having a dissociation constant $k$ measured at room temperature and in aqueous solution less than about $2 \times 10^{-5}$, and eliminating the excess acid and the water formed.

7. The process of preparing a liquid antioxidant for rubber, which comprises mixing equi-molecular amounts of n-butyraldehyde and aniline containing from about 1/30 to about 2 molecular amounts of acetic acid for each molecular amount of the aldehyde, and eliminating the excess acid and the water formed.

8. A n-butyraldehyde-aromatic primary amine condensate which has antioxidant properties for vulcanized rubber, and which has characteristics such as may be obtained by reacting equi-molecular amounts of n-butyraldehyde and a primary aromatic amine in the presence of between about 1/30 and about 2 molecular amounts of a concentrated weak organic acid for each molecular amount of the aldehyde, and eliminating excess acid and the water formed.

9. A n-butyraldehyde-aromatic primary amine condensate which has antioxidant properties for vulcanized rubber, and which has characteristics such as may be obtained by reacting equi-molecular amounts of n-butyraldehyde and a primary aromatic mono-amine in the presence of from about 1/30 to about 2 molecular amounts of a concentrated weak organic acid for each molecular amount of the aldehyde, and eliminating excess acid and the water formed.

10. A n-butyraldehyde-aromatic primary amine condensate which has antioxidant properties for vulcanized rubber, and which has characteristics such as may be obtained by reacting equi-molecular amounts of n-butyraldehyde and a primary aromatic amine in the presence of between about ½ and about 2 molecular amounts of a concentrated weak organic acid for each molecular amount of the aldehyde, and eliminating the excess acid and the water formed.

11. The process of condensing n-butyraldehyde with an aromatic primary amine, which comprises mixing equi-molecular amounts of said aldehyde and amine in the presence of between about 1/30 and about 2 molecular amounts of a concentrated weak organic acid for each molecular amount of the aldehyde.

12. The process of condensing n-butyraldehyde with an aromatic primary amine, which comprises mixing equi-molecular amounts of said aldehyde and amine in the presence of between about ½ and about 2 molecular amounts of a concentrated weak organic acid for each molecular amount of the aldehyde.

13. The process of preparing a liquid antioxidant for rubber, which comprises mixing equi-molecular amounts of n-butyraldehyde and aniline containing from about 1/30 to about 2 molecular amounts of glacial acetic acid for each molecular amount of the aldehyde.

14. A n-butyraldehyde-aniline condensate which has antioxidant properties for vulcanized rubber, and which has characteristics such as may be obtained by reacting equi-molecular amounts of n-butyraldehyde and aniline in the presence of about 1/30 to about 2 molecular amounts of glacial acetic acid for each molecular amount of the aldehyde, and eliminating the excess acid and the water formed.

15. A n-butyraldehyde-aniline condensate which has antioxidant properties for vulcanized rubber, and which has characteristics such as may be obtained by reacting equi-molecular amounts of n-butyraldehyde and aniline in the presence of about 1/30 to about 2 molecular amounts of a weak organic acid for each molecular amount of the aldehyde, and eliminating the excess acid and the water formed.

16. A n-butyraldehyde-o-toluidine condensate which has antioxidant properties for vulcanized rubber, and which has characteristics such as may be obtained by reacting equi-molecular amounts of n-butyraldehyde and o-toluidine in the presence of about 1/30 to about 2 molecular amounts of a weak organic acid for each molecular amount of the aldehyde, and eliminating the excess acid and the water formed.

17. A n-butyraldehyde-o-toluidine condensate which has antioxidant properties for vulcanized rubber, and which has characteristics such as may be obtained by reacting equi-molecular amounts of n-butyraldehyde and o-toluidine in the presence of about 1/30 to about 2 molecular amounts of acetic acid for each molecular amount of the aldehyde, and eliminating the excess acid and the water formed.

18. A n-butyraldehyde-o-toluidine condensate which has antioxidant properties for vulcanized rubber, and which has characteristics such as may be obtained by reacting equi-molecular amounts of n-butyraldehyde and o-toluidine in the presence of about 1/30 to about 2 molecular amounts of glacial acetic acid for each molecular amount of the aldehyde, and eliminating the excess acid and the water formed.

19. A n-butyraldehyde-naphthylamine condensate which has antioxidant properties for vulcanized rubber, and which has characteristics such as may be obtained by reacting equi-molecular amounts of n-butyraldehyde and a naphthylamine in the presence of about 1/30 to about 2 molecular amounts of a weak organic acid for each molecular amount of the aldehyde, and eliminating the excess acid and the water formed.

20. A n-butyraldehyde-naphthylamine condensate which has antioxidant properties for vulcanized rubber, and which has characteristics such as may be obtained by reacting equi-molecular amounts of n-butryraldehyde and a naphthylamine in the presence of about 1/30 to about 2 molecular amounts of acetic acid for each molecular amount of the aldehyde, and eliminating the excess acid and the water formed.

21. A n-butyraldehyde-naphthylamine condensate which has antioxidant properties for vulcanized rubber, and which has characteristics such as may be obtained by reacting equi-molecular amounts of n-butyraldehyde and a naphthylamine in the presence of about 1/30 to about 2 molecular amounts of glacial acetic acid for each molecular amount of the aldehyde, and eliminating the excess acid and the water formed.

22. A n-butyraldehyde-alpha-naphthylamine condensate which has antioxidant properties for vulcanized rubber, and which has characteristics such as may be obtained by reacting equi-molecular amounts of n-butyraldehyde and alpha-naphthylamine in the presence of about 1/30 to about 2 molecular amounts of a weak organic acid for each molecular amount of the aldehyde, and eliminating the excess acid and the water formed.

23. A n-butyraldehyde-alpha-naphthylamine condensate which has antioxidant properties for vulcanized rubber, and which has characteristics such may be obtained by reacting equi-molecular amounts of n-butyraldehyde and alpha-naphthylamine in the presence of about 1/30 to about 2 molecular amounts of acetic acid for each molecular amount of the aldehyde, and eliminating the excess acid and the water formed.

24. A n-butyraldehyde-alpha-naphthylamine condensate which has antioxidant properties for vulcanized rubber, and which has characteristics such as may be obtained by reacting equi-molecular amounts of n-butyraldehyde and alpha-naphthylamine in the presence of about 1/30 to about 2 molecular amounts of glacial acetic acid for each molecular amount of the aldehyde, and eliminating the excess acid and the water formed.

25. A n-butyraldehyde-aniline condensate which has antioxidant properties for vulcanized rubber, and which has characteristics such as may be obtained by reacting equi-molecular amounts of n-butyraldehyde and aniline in the presence of about ½ to about 2 molecular amounts of glacial acetic acid for each molecular amount of the aldehyde, and eliminating the excess acid and the water formed.

26. A n-butyraldehyde-aniline condensate which has antioxidant properties for vulcanized rubber, and which has characteristics such as may be obtained by reacting equi-molecular amounts of n-butyraldehyde and aniline in the presence of about ½ to about 2 molecular amounts of a weak organic acid for each molecular amount of the aldehyde, and eliminating the excess acid and the water formed.

27. A n-butyraldehyde-o-toluidine condensate which has antioxidant properties for vulcanized rubber, and which has characteristics such as may be obtained by reacting equi-molecular amounts of n-butyraldehyde and o-toluidine in the presence of about ½ to about 2 molecular amounts of a weak organic acid for each molecular amount of the aldehyde, and eliminating the excess acid and the water formed.

28. A n-butyraldehyde-o-toluidine condensate which has antioxidant properties for vulcanized rubber, and which has characteristics such as may be obtained by reacting equimolecular amounts of n-butyraldehyde and o-toluidine in the presence of about ½ to about 2 molecular amounts of acetic acid for each molecular amount of the aldehyde, and eliminating the excess acid and the water formed.

29. A n-butyraldehyde-o-toluidine condensate which has antioxidant properties for vulcanized rubber, and which has characteristics such as may be obtained by reacting equi-molecular amounts of n-butyraldehyde and o-toluidine in the presence of about ½ to about 2 molecular amounts of glacial acetic acid for each molecular amount of the aldehyde, and eliminating the excess acid and the water formed.

30. A n-butyraldehyde-naphthylamine condensate which has antioxidant properties for vulcanized rubber, and which has characteristics such as may be obtained by reacting equi-molecular amounts of n-butyraldehyde and a naphthylamine in the presence of about ½ to about 2 molecular amounts of a weak organic acid for each molecular amount of the aldehyde, and eliminating the excess acid and the water formed.

31. A n-butyraldehyde-naphthylamine condensate which has antioxidant properties for vulcanized rubber, and which has characteristics such as may be obtained by reacting equi-molecular amounts of n-butyraldehyde and a naphthylamine in the presence of about ½ to about 2 molecular amounts of acetic acid for each molecular amount of the aldehyde, and eliminating the excess acid and the water formed.

32. A n-butyraldehyde-naphthylamine condensate which has antioxidant properties for vulcanized rubber, and which has characteristics such as may be obtained by reacting equi-molecular amounts of n-butyraldehyde and a naphthylamine in the presence of about ½ to about 2 molecular amounts of glacial acetic acid for each molecular amount of the aldehyde, and eliminating the excess acid and the water formed.

33. A n-butyraldehyde-alpha-naphthylamine condensate which has antioxidant properties for vulcanized rubber, and which has characteristics such as may be obtained by reacting equimolecular amounts of n-butyraldehyde and alpha-naphthylamine in the presence of about ½ to about 2 molecular amounts of a weak organic acid for each molecular amount of the aldehyde, and eliminating the excess acid and the water formed.

34. A n-butyraldehyde-alpha-naphthylamine condensate which has antioxidant properties for vulcanized rubber, and which has characteristics such as may be obtained by reacting equimolecular amounts of n-butyraldehyde and alpha-naphthylamine in the presence of about ½ to about 2 molecular amounts of acetic acid for each molecular amount of the aldehyde, and eliminating the excess acid and the water formed.

35. A n-butyraldehyde-alpha-naphthylamine condensate which has antioxidant properties for vulcanized rubber, and which has characteristics such as may be obtained by reacting equimolecular amounts of n-butyraldehyde and alpha-naphthylamine in the presence of about ½ to about 2 molecular amounts of glacial acetic acid for each molecular amount of the aldehyde, and eliminating the excess acid and the water formed.

IRA WILLIAMS.

CERTIFICATE OF CORRECTION.

Patent No. 1,939,192.  December 12, 1933.

IRA WILLIAMS.

It is hereby certified that error appears in the printed specification of the above numbered patent requiring correction as follows: Page 3, line 61, claim 5, strike out the word "moles" and insert the same after "2" in line 60, of same claim; and that the said Letters Patent should be read with this correction therein that the same may conform to the record of the case in the Patent Office.

Signed and sealed this 9th day of January, A. D. 1934.

F. M. Hopkins
Acting Commissioner of Patents.

(Seal)